E. S. PIERCE
Drill-Chucks.

No. 210,875. Patented Dec. 17, 1878.

Witnesses.
John T. Peters
Willard Eddy

Inventor.
Elijah S. Pierce
by Theo. G. Ellis, Attorney

UNITED STATES PATENT OFFICE.

ELIJAH S. PIERCE, OF HARTFORD, CONNECTICUT.

IMPROVEMENT IN DRILL-CHUCKS.

Specification forming part of Letters Patent No. 210,875, dated December 17, 1878; application filed March 22, 1878.

*To all whom it may concern:*

Be it known that I, ELIJAH S. PIERCE, of Hartford, in the county of Hartford and State of Connecticut, have invented certain new and useful Improvements in Scroll-Chucks; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to chucks such as are generally used to attach to a revolving spindle to hold any article by its jaws, so that it will be in the center of motion as the spindle revolves; and the object of my improvement is to provide a better means of moving the jaws out and in simultaneously, and to give them a stronger gripe upon the object held.

My invention consists in the application of a concave scroll to the backs of the jaws to move them in and out, and also in the construction and arrangement of the scroll, whereby a more direct pressure is brought upon the object to be held in the jaws, and a stronger scroll and stronger jaw-teeth are obtained.

Figure 2:
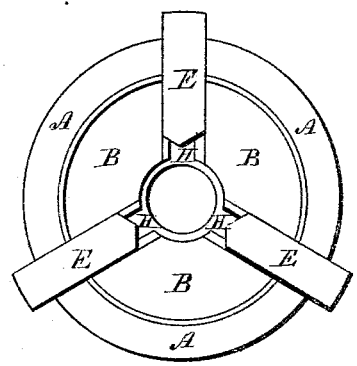
Figure 1:
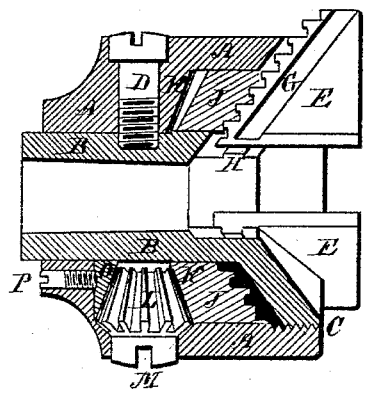
Figure 4:
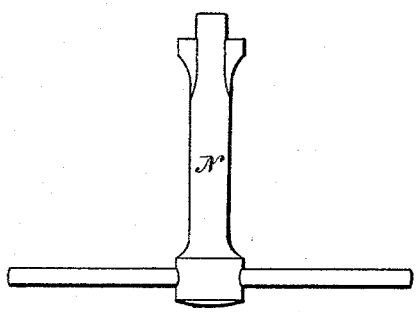
Figure 3:
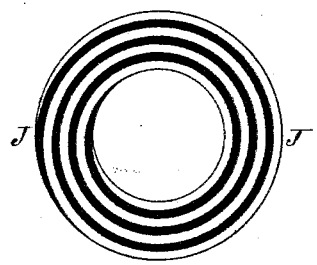

In the accompanying drawing, Figure 1 is a front view of a chuck containing my improvement. Fig. 2 is a longitudinal section through the middle of the chuck, showing the parts beyond. Fig. 3 is a front view of my improved concave scroll. Fig. 4 shows the key that is applied to the chuck to turn the jaws out or in.

A is a case or shell, forming the exterior surface of the body of the chuck. B is a hollow sleeve, forming the interior of the body of the chuck. Its rear portion is cylindrical, and fits into the rear of the outer shell, A, while at the forward end it flares outward, and is furnished with a screw-thread at C, by which it is secured in its place. When the two parts are put together they are also firmly held by the set-screw D, so as to form a solid body for holding and inclosing the working parts of the chuck. E E E are jaws, sliding in inclined grooves cut through the parts A and B. The sides of the jaws are furnished with the slots G, and the grooves in the shell have corresponding ridges H, which fit into them and firmly guide the jaws in their line of motion. J is a concave scroll (shown in section in Fig. 2, and a front view of which is shown in Fig. 3) for operating the jaws. It is fitted into a recess in the shell between the parts A and B, and turns upon the sleeve B as an axis. Its rear surface is furnished with a bevel-gear, K, into which the bevel-pinion L fits, and by which it is operated. M is a slot, into which the key N enters to turn the pinion. The block O holds the pinion in place, and is secured by the set-screw P.

The face of the concave scroll, in which its chief peculiarity consists, is a spiral or volute developed upon the face of a hollow cone. This permits the thread to have greater bearing upon the teeth of the jaws, to receive the pressure when forcing the jaws inward to grasp the object to be held by the chuck, but less bearing upon the teeth when moving the jaws outward, in which direction there is little or no pressure required. It also affords solid metal behind those surfaces of the teeth or steps of both the scroll and the jaws which act to force the jaws inward, so that the pressure, however great, is communicated directly through the solid metal of both these parts, without having a tendency to break off the tooth or thread, as is the case with the scroll-chucks now in use. This construction also gives a larger surface in the working parts, where the most power is required, and allows the use of as fine a thread as may be desired, to give a very powerful motion to the jaws of the chuck without any danger of breaking the threads or teeth, which cannot be done with chucks of the ordinary construction.

With my improved form of scroll the pressure is more directly inward upon the object to be held by the jaws than can possibly be obtained by means of the ordinary flat scroll acting upon the rear ends of the jaws.

By means of my improvement the inner or working edge of the jaw can be of the ordinary length, while the outer part of the conical scroll reaches over forward upon the jaws, and presses them directly inward upon the object held.

My concave scroll in its operation upon the jaws of a chuck is not confined to the precise form of construction of the other parts herein shown and described, but it is applicable to any form of chuck in which the scroll and jaws can be arranged to act relatively in the manner described, the other parts admitting of any ordinary construction and arrangement that may be suggested by mechanical skill.

What I claim as my invention is—

The combination of a volute of the form described and shown, developed upon the sides of a hollow cone, having its wider faces toward the center, with correspondingly-shaped teeth upon the inclined ends of the jaw of a chuck, substantially as and for the purpose herein shown and described.

ELIJAH S. PIERCE.

Witnesses:
 THEO. G. ELLIS,
 JOHN T. PETERS.